United States Patent
Moulios et al.

(10) Patent No.: US 8,538,761 B1
(45) Date of Patent: Sep. 17, 2013

(54) STRETCHING/SHRINKING SELECTED PORTIONS OF A SIGNAL

(75) Inventors: Christopher J. Moulios, Cupertino, CA (US); Nikhil M. Bhatt, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1608 days.

(21) Appl. No.: 11/195,007

(22) Filed: Aug. 1, 2005

(51) Int. Cl.
*G10L 11/00* (2006.01)
*G06F 17/00* (2006.01)

(52) U.S. Cl.
USPC ............................................ 704/278; 700/94

(58) Field of Classification Search
USPC ......................................... 704/278, 500–504
See application file for complete search history.

(56) References Cited

U.S. PATENT DOCUMENTS

| | | | |
|---|---|---|---|
| 3,696,401 A * | 10/1972 | Vance | 341/74 |
| 3,932,888 A * | 1/1976 | Lemke et al. | 386/85 |
| 4,941,035 A * | 7/1990 | Judge | 348/180 |
| 5,113,252 A * | 5/1992 | Horie et al. | 358/528 |
| 5,450,132 A * | 9/1995 | Harris et al. | 375/240.12 |
| 5,537,530 A | 7/1996 | Edgar et al. | |
| 5,649,050 A * | 7/1997 | Hardwick et al. | 704/203 |
| 5,752,224 A * | 5/1998 | Tsutsui et al. | 704/225 |
| 5,758,020 A * | 5/1998 | Tsutsui | 704/204 |
| 6,088,455 A * | 7/2000 | Logan et al. | 380/200 |
| 6,148,175 A * | 11/2000 | Freedland | 455/3.06 |
| 6,232,540 B1 * | 5/2001 | Kondo | 84/612 |
| 6,266,643 B1 * | 7/2001 | Canfield et al. | 704/278 |
| 6,298,482 B1 | 10/2001 | Seidman et al. | |
| 6,337,947 B1 * | 1/2002 | Porter et al. | 386/55 |
| 7,055,166 B1 | 5/2006 | Logan et al. | |
| 7,424,677 B2 | 9/2008 | Sezan et al. | |
| 7,454,010 B1 | 11/2008 | Ebenezer | |
| 7,702,014 B1 | 4/2010 | Kellock et al. | |
| 2002/0028060 A1 * | 3/2002 | Murata et al. | 386/52 |
| 2002/0188602 A1 | 12/2002 | Stubler et al. | |
| 2003/0014135 A1 | 1/2003 | Moulios | |
| 2003/0067554 A1 | 4/2003 | Klarfeld et al. | |
| 2003/0084065 A1 | 5/2003 | Lin et al. | |
| 2003/0093790 A1 | 5/2003 | Logan et al. | |
| 2004/0189827 A1 | 9/2004 | Kim et al. | |
| 2004/0199277 A1 | 10/2004 | Bianchi et al. | |
| 2010/0303257 A1 | 12/2010 | Moulios et al. | |

OTHER PUBLICATIONS

Sonic Foundry, Inc. "Sound Forge 6.0," copyright 2002-2003, Sonic Foundry, Inc. pp. 1-14 and 129-142.*

(Continued)

*Primary Examiner* — Angela A Armstrong
(74) *Attorney, Agent, or Firm* — Blakely, Sokoloff, Taylor & Zafman LLP

(57) ABSTRACT

Techniques are described to allow a user of a signal editing tool to "stretch" or "shrink" a selected portion of a recorded signal to change the length of the selected portion of the signal relative to a particular domain, without stretching or shrinking other parts of the signal. In the context of audio signals, techniques are provided to allow a user to "time stretch" an audio signal file to change the duration of the stretched portion of the audio. The user may select how the change affects the total duration of the audio signal. Options are provided for "shifting" the non-selected portion of the signal, or for not shifting the non-selected portion of the signal. When the non-selected portion is not shifted, the signal editing tool automatically generates audio for the gap (for shrinking operations), and automatically deletes audio that overlaps with the stretched portion (for stretching operations).

22 Claims, 6 Drawing Sheets

(56) References Cited

OTHER PUBLICATIONS

Higgins, D., "Wave Corrector v3.0 Vinyl/Tape to CD-R Processing Digital Audio Editing for the PC User Manual," Jul. 22, 2004, Ganymede Test & Measurement, v3.0, from <http://web.archive.org/web/20040722132002/www.wavecor.co.uk/help300.pdf> (86 pgs).

U.S Appl. No. 11/104,995, filed Apr. 12, 2005, Notice of Allowance, Feb. 17, 2010.
U.S. Appl. No. 11/181,660, filed Jul. 13, 2005, Office Action, Apr. 2, 2010.
Sonic Foundry, Inc. "Sound Forge 6.0," copyright 2002-2003, Sonic Foundry, Inc. pp. 1-14 and 129-142, http://www.sonycreativesoftware.com/download/manuals/soundforgefamily.

* cited by examiner

STRETCHING/SHRINKING SELECTED PORTIONS OF A SIGNAL

FIELD OF THE INVENTION

The present invention relates to digital editing and, more specifically, to editing signal data.

BACKGROUND

It is desirable, in a variety of contexts, to capture signals. The nature of the signals may vary from context to context. For example, in a medical context, it may be desirable to capture signals that represent heart activity. In the context of sound studios, it may be desirable to capture audio signals produced by music artists. The techniques described herein are not limited to any particular type of recorded signal. The digital representation of a signal is referred to herein as "signal data".

For a variety of reasons, it may be desirable to edit the signal data after a signal has been digitally recorded. Many signal editing applications are available for performing post-recording edits to a captured signal. In the context of audio signals, many audio editing applications allow a user to listen to the audio. While the audio is being played, the user is presented with a visual representation of the signal, with an indication of the location, within the signal, that is currently being played. While listening to the audio and watching the visual representation of the signal, the user may identify a problem that requires fixing. For example, the user may hear a "cough", and see a spike that represents the cough in the visual representation of the signal. The user may then use a tool provided by the editing application to correct the problem. For example, the user may replace the portion of the signal that contains the cough with an ambient noise print, as described in U.S. patent application Ser. No. 11/104,995, filed on Apr. 12, 2005, the contents of which are incorporated herein by this reference.

Sometimes, it is desirable change the length of a recorded signal relative to a particular domain, such as time. For example, in the context of audio signals, it may be desirable to convert a 17 minute lecture into a 15 minute lecture. Some digital signal editing applications may provide mechanisms for accomplishing such wholesale conversions. However, such conversions may not produce optimal results. For example, there may be a portion of the 17 minute lecture in which the speaker talks so quickly that it is difficult to catch all of the words. If the duration of the entire lecture is reduced, then all speech within the lecture will be played back at a rate that is even faster than the original rate. Consequently, after the conversion, the portion of the lecture in which the speaker talks quickly will be even more difficult to understand.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Techniques and mechanisms are provided herein to allow a user of a signal editing tool to "stretch" all or part of a recorded signal to change the length of the signal relative to a particular domain. In the context of audio signals, techniques and mechanisms are provided to allow a user to "time stretch" an audio signal file to change the duration of the stretched portion of the audio. The change in the duration of the selected portion of audio data does not necessarily change the pitch of the audio contained within the selected portion. Consequently, the audio contained in the selected portion, such as dialog and other material, continues to sound "natural".

Various techniques may be used for processing the signal data to stretch or shrink the duration of the content contained therein. The present invention is not limited to any particular stretching or shrinking techniques. The techniques described herein provide user interface tools that allow the user to perform such stretching and shrinking on user-selected portions of the signal, without affecting other portions of the signal. Thus, in the example given above in which a 17 minute lecture is converted to a 15 minute lecture, the techniques provided herein may be used so that the total time of the lecture is reduced without speeding up the portion of the lecture in which the lecturer talks quickly. In fact, the tools provided herein may be used to stretch out the fast-talking portion of the lecture, while still reducing the overall length of the lecture by shrinking other user-selected portions of the lecture.

To illustrate the techniques described herein, embodiments shall be described in which the audio signals are being adjusted relative to the time domain. However, the techniques described herein are not limited to audio signals, not to stretching/shrinking operations within the time domain.

Overview of Using the Stretch Tool

Figure 1A:
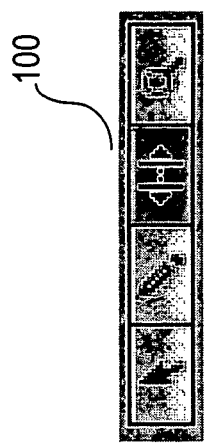
FIG. 1A is a block diagram of control buttons provided by a signal editing tool, according to an embodiment of the invention.

According to one embodiment, a digital signal editing application includes a plurality of buttons that correspond to different digital editing tools, as illustrated in FIG. 1A. To select a portion of a signal, a user can click and drag horizontally across a visual depiction of the signal (a "waveform display"). The portion of the signal that is selected in this manner is referred to as the "selected portion" of the signal.

Figure 1B:
FIG. 1B is a block diagram of a cursor that is displayed when the user hovers over the edge of a selected portion when the stretch tool has been selected, according to an embodiment of the invention.

One of the buttons illustrated in FIG. 1A is a "Stretch Tool" button 100. Selecting the Stretch Tool button 100 activates the stretch tool. The stretch tool does not have to be active to select an area to be stretched. The stretch tool can be invoked on the current selection, regardless of how the current selection was selected. After a selected portion of the signal has been selected and the stretch tool is activated, if the user hovers the cursor over either edge of the selection, the cursor becomes a stretch cursor. A stretch cursor used in one embodiment is illustrated in FIG. 1B.

Using the stretch cursor, the user is then able to click and drag either edge of the selected portion. The edge may be dragged in either direction. When a selected edge is dragged inward relative to the selected portion, the selected portion is shortened relative to the domain represented by the x-axis. In an embodiment in which the x-axis represents time, and the signal is an audio signal, dragging an edge inward causes the duration of the audio within the selected portion to be shortened.

When a selected edge is dragged outward relative to the target area, the selected portion is lengthened relative to the domain represented by the x-axis. In an embodiment in which the x-axis represents time, and the signal is an audio signal, dragging an edge outward causes the duration of the audio within the selected portion to be lengthened.

Examples are given hereafter in which the right edge of the selected section is adjusted using the stretch tool. However, the techniques apply equally to adjustments made to the left edge of a selected portion of the signal.

The Effect on the Non-Selected Portion of the Signal

The stretching or shrinking of a selected portion of a signal may have any one of a number of possible effects on the non-selected portion of the signal. According to one embodiment, the user is provided with controls for specifying which effect the stretch/shrink operation will have on the non-selected portion of the signal. Specifically, in one embodiment, holding the option key establishes whether the other signal data is "shifted" on the timeline, or whether the stretching will delete (when increasing length) or create data (when decreasing length) to maintain the signal's time synchronization.

Shifting the Non-Selected Portion of the Signal

Figure 2:
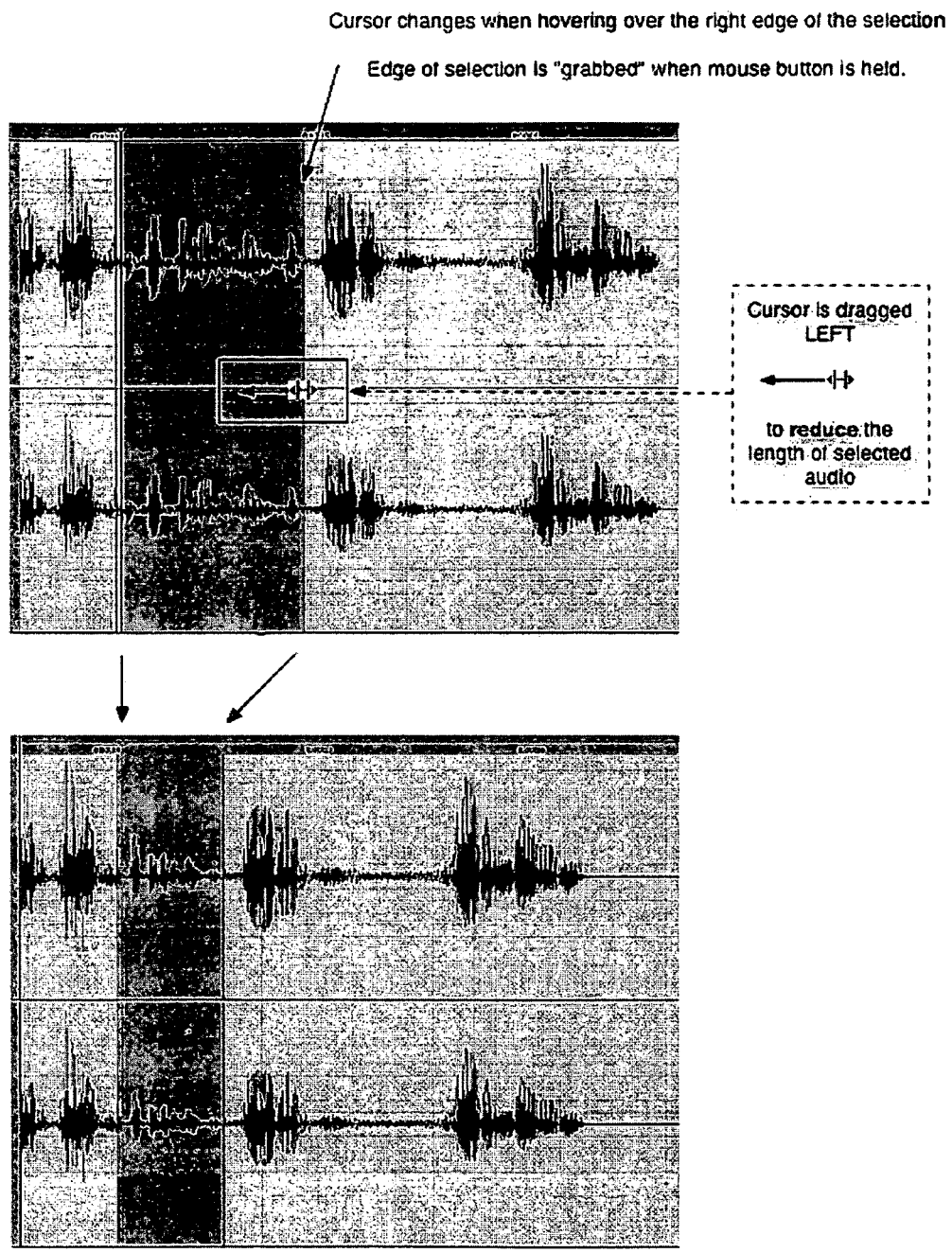
FIG. 2 is a block diagram that illustrates a scenario in which the user is shrinking a selected portion of the signal, and has selected the "shifting" option, according to an embodiment of the invention.

Referring to FIG. 2, it illustrates a scenario in which the user is shrinking a selected portion of the signal, and has selected the "shifting" option. In response to the shrinking operation, the duration of the selected portion is reduced, and the durations of the non-selected portions (on both sides of the selected portion) are unaffected. Consequently, the non-selected portion of the signal that follows the selected portion shifts to the left, so that the shrinking of the selected portion does not cause any gap in the visual depiction of the signal. In this case, the duration of the entire audio file is reduced by the same amount of time as the reduction specified on the selected portion (since the durations of all non-selected portions do not change). According to one embodiment, the signal data stretches or shrinks in proportion to the ratio of the original selection's width (in pixels) to the adjusted selection's width (in pixels).

Figure 3:
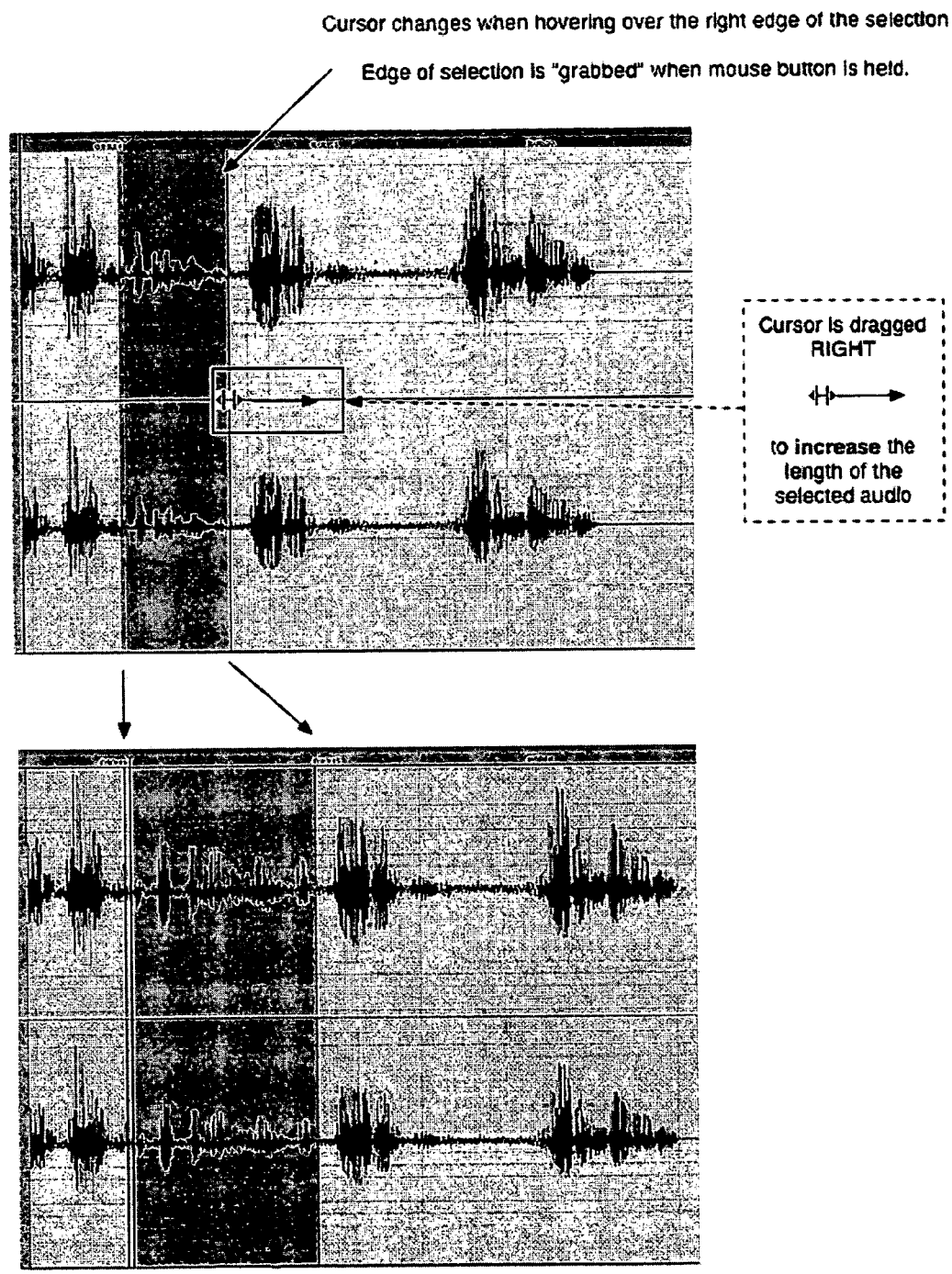
FIG. 3 is a block diagram that illustrates a scenario in which the user is stretching a selected portion of the signal, and has selected the "shifting" option, according to an embodiment of the invention.

Referring to FIG. 3, it illustrates a scenario in which the user is stretching a selected portion of the signal, and has selected the "shifting" option. In response to the stretching operation, the duration of the selected portion is increased, and the durations of the non-selected portions (on both sides of the selected portion) are unaffected. Consequently, the non-selected portion of the signal that follows the selected portion shifts to the right, so that the stretching of the selected portion does not cover the visual depiction of any non-selected portion of the signal. In this case, the duration of the entire audio file is increased by the same amount of time as the increase specified on the selected portion (since the durations of all non-selected portions do not change).

Creating/Deleting a Non-Selected Portion of the Signal

Figure 4:
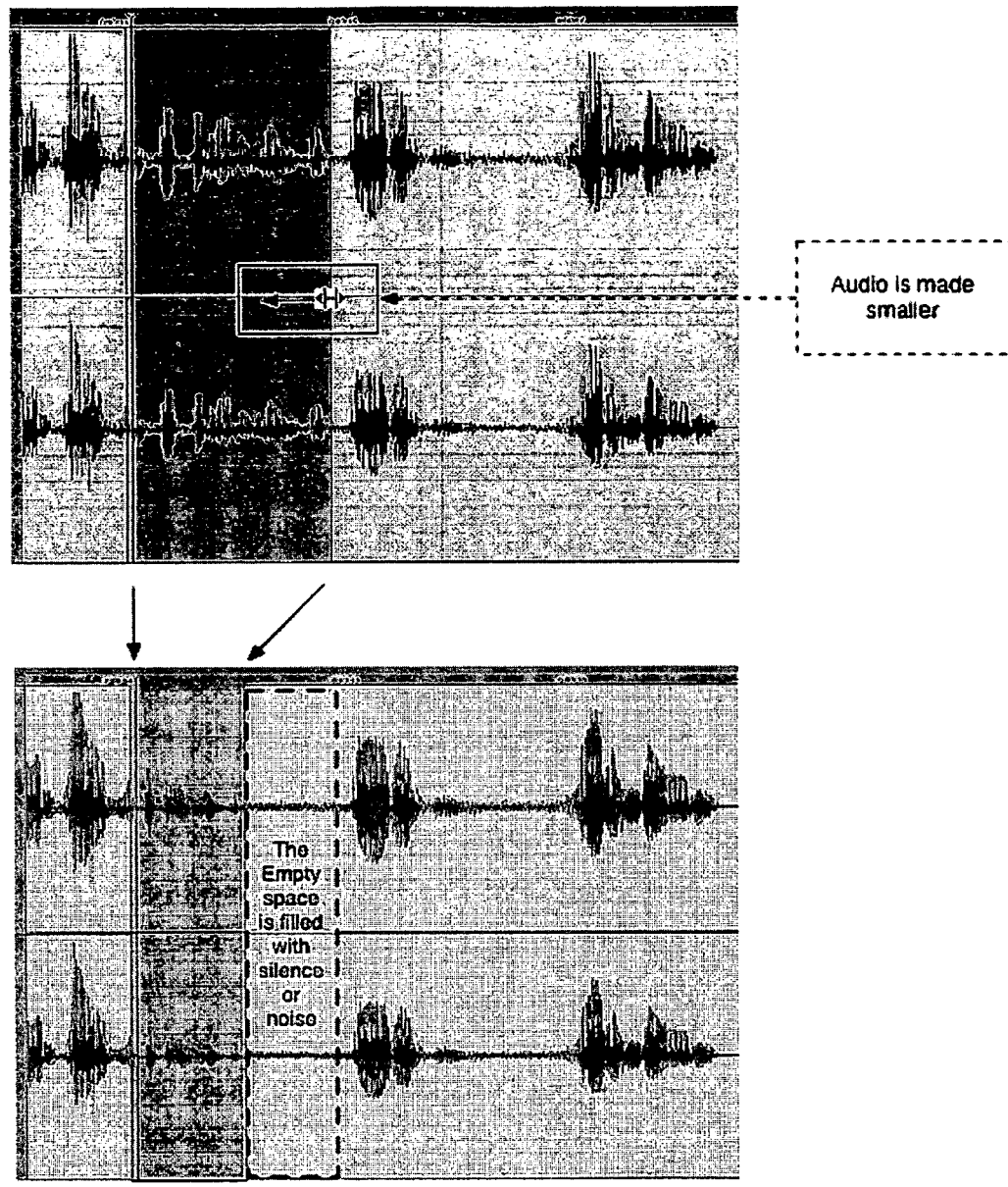
FIG. 4 is a block diagram that illustrates a scenario in which the user is shrinking a selected portion of the signal, and has not selected the "shifting" option, according to an embodiment of the invention.

Referring to FIG. 4, it illustrates a scenario in which the user is shrinking a selected portion of the signal, and has not selected the "shifting" option. In response to the shrinking operation, the duration of the selected portion is reduced, and the durations of the non-selected portions (on both sides of the selected portion) are unaffected. However, unlike the scenario illustrated in FIG. 2, the non-selected portion of the signal that follows the selected portion does not shift to the left. Instead, the shrinking operation creates a gap in the visual depiction of the signal. The gap corresponds to new audio that is automatically inserted into the audio data. In this case, the duration of the entire audio file remains the same, because the new audio data inserted into the gap is equal to the reduction specified on the selected portion (and the duration of all non-selected portions do not change).

Various techniques may be used to create the audio data that is used to fill the gap that is created by the shrinking operation. In one embodiment, the audio data generated for the gap is data that represents silence. In another embodiment, the audio data generated for the gap is an ambient noise segment generated using the techniques referred to above. In one embodiment, the user is provided with user interface controls that allow the user to specify what kind of audio generation technique should be used to fill the gap.

In yet another scenario, the user may stretch the selected portion without selecting the "shifting" option. In this case, the non-selected portion of the audio that overlaps with the stretched selected portion of the audio is deleted from the audio data. This type of stretching operation may be useful when fast dialog is followed by a long pause. The fast dialog portion of the signal may be stretched to cover the long pause to (1) make the dialog more understandable, (2) reduce the duration of the pause, and (3) leave the total duration of the audio signal unaffected.

Visual Feedback During Stretch/Shrink Operations

According to one embodiment, the signal editing application provides visual feedback during stretch/shrink operations performed using the stretch tool. Specifically, when an edge is grabbed and the signal is stretched, the signal editing application overlays an on-screen graphic representation of the waveform whose pixels are resampled (stretch onscreen) to fit the new size. Thus, the user may see both a depiction of the unchanged selected portion, and a depiction of the modified selected portion. The signal editing tool thus displays a graphic preview of the waveform at the correct size, that transparently updates interactively when the user moves the mouse while an edge is selected.

Figure 5:
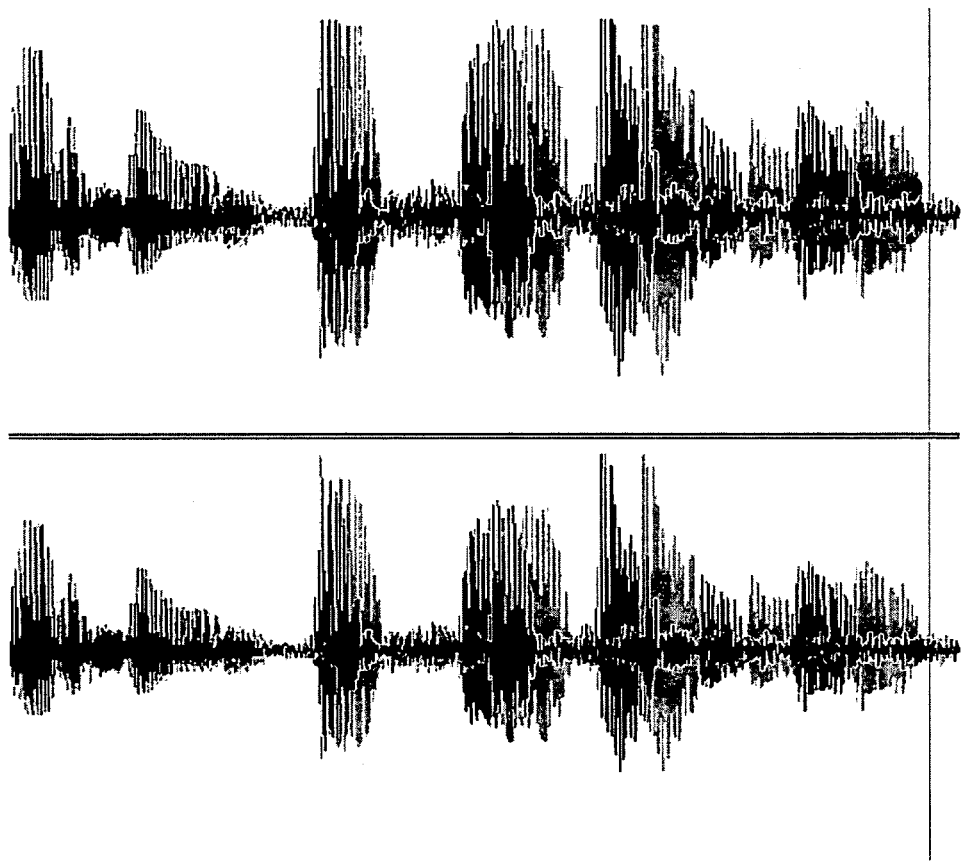
FIG. 5 is a block diagram that illustrates how an overlay may be displayed when a user drags the right edge of the selected portion to the right, thereby stretching the selected portion, according to an embodiment of the invention.

Referring to FIG. 5, it illustrates how an overlay may be displayed when a user drags the right edge of the selected portion to the right, thereby stretching the selected portion. The overlay, showing the stretched selected portion may be depicted in one color (e.g. purple), while the original selected portion may be depicted in another color (e.g. black).

Hardware Overview

Figure 6:
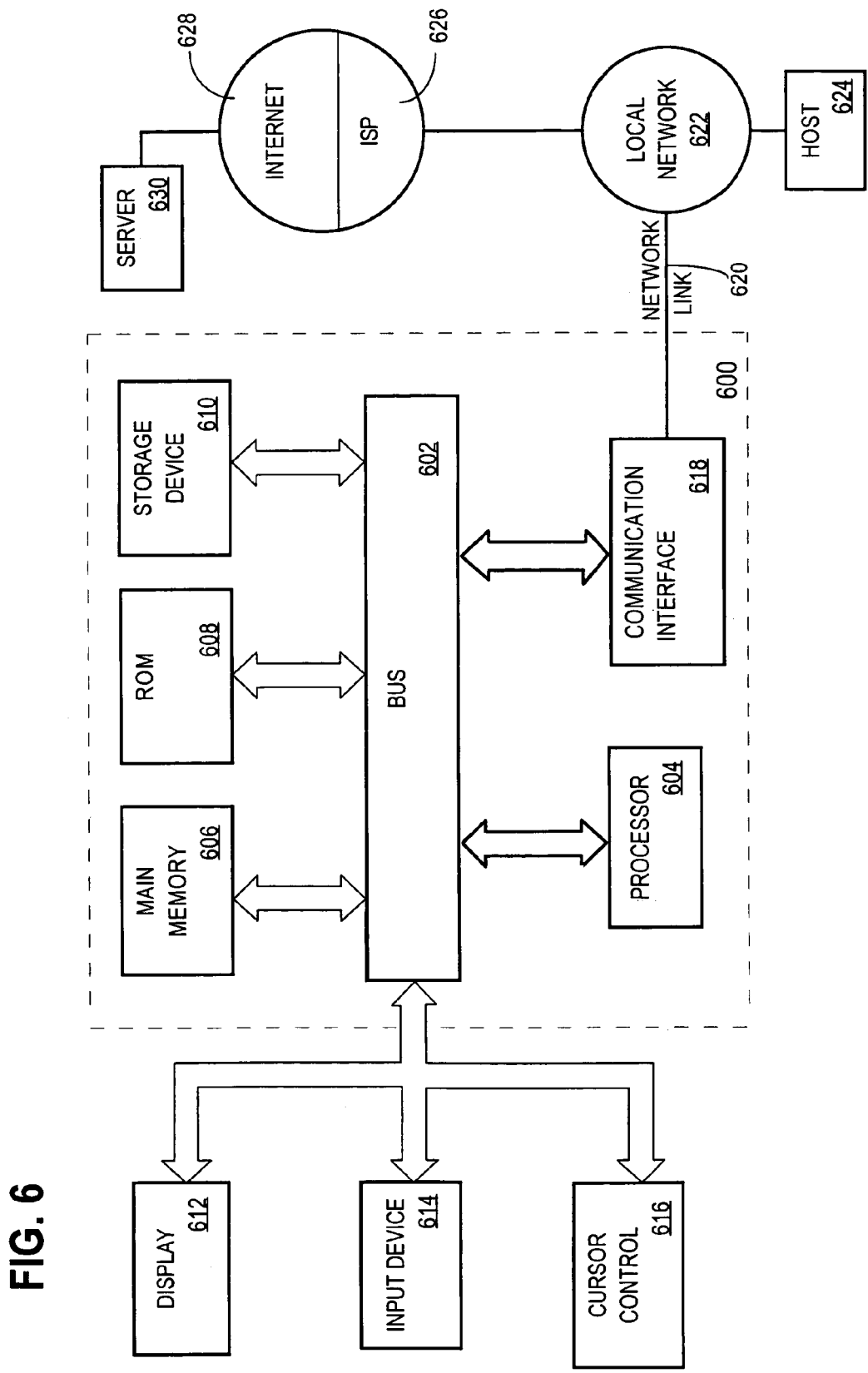
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for editing signal data that represents a signal, the method comprising:
   receiving, by a computer, first input that selects a portion of the signal, wherein the signal comprises the selected portion and one or more non-selected portions, and wherein at least one of the one or more non-selected portions follows the selected portion on a timeline;
   producing, by the computer, in response to receiving second input, edited signal data by changing a duration of the selected portion of the signal relative to a time domain by shrinking the selected portion of the signal without changing the duration of the one or more non-selected portions of the signal relative to the time domain and without shifting the one or more non-selected portions on the timeline to create a gap between the selected portion and the one or more non-selected portions, and by automatically filling the gap with data that represents a segment of silence or ambient noise.

2. The method of claim 1 further comprising:
   producing, in response to receiving third input, edited signal data by changing the duration of the selected portion of the signal relative to the time domain by shrinking the selected portion of the signal without changing the duration of the one or more non-selected portions of the signal relative to the time domain, and by automatically shifting the one or more non-selected portions of the signal that followed the selected portion on the timeline so that no gap exists after the duration of the selected portion has been reduced.

3. A non-transitory computer-readable medium storing one or more sequences of instructions which, when executed by one or more processors, causes the one or more processors to perform the method recited in claim 2.

4. The method of claim 1 further comprising:
   producing, in response to receiving third input, edited signal data by changing the duration of the selected portion of the signal relative to the time domain by stretching the selected portion of the signal without changing the duration of the one or more non-selected portions of the signal relative to the time domain and without shifting the one or more non-selected portions that followed the selected portion on the timeline, and by deleting an overlapping portion of the one or more non-selected portions that followed the selected portion on the timeline and that otherwise would overlap the selected portion of the signal.

5. A non-transitory computer-readable medium storing one or more sequences of instructions which, when executed by one or more processors, causes the one or more processors to perform the method recited in claim 4.

6. The method of claim 1 further comprising:
   producing, in response to receiving third input, edited signal data by changing the duration of the selected portion of the signal relative to the time domain by stretching the selected portion of the signal without changing the duration of the one or more non-selected portions, and by automatically shifting the one or more non-selected portions of the signal that followed the selected portion on the timeline to allow for the increased duration of the selected portion after the duration of the selected portion has been increased.

7. A non-transitory computer-readable medium storing one or more sequences of instructions which, when executed by one or more processors, causes the one or more processors to perform the method recited in claim 6.

8. The method of claim 1 further comprising:
   generating, while receiving second input, a visual depiction of the selected portion of the signal that reflects a changed duration.

9. The method of claim 8 further comprising:
   generating, while receiving second input, a second visual depiction of the selected portion of the signal that reflects an unchanged duration;
   wherein the visual depiction of the selected portion of the signal that reflects a changed duration is an overlay displayed concurrently with the second visual depiction of the selected portion of the signal that reflects an unchanged duration.

10. A non-transitory computer-readable medium storing one or more sequences of instructions which, when executed by one or more processors, causes the one or more processors to perform the method recited in claim 9.

11. A non-transitory computer-readable medium storing one or more sequences of instructions which, when executed by one or more processors, causes the one or more processors to perform the method recited in claim 8.

12. A non-transitory computer-readable medium storing one or more sequences of instructions which, when executed by one or more processors, causes the one or more processors to perform the method recited in claim 1.

13. A method for editing a signal data that represents a signal, the method comprising:
   displaying a visual depiction of the signal;
   providing a user interface control for changing a duration of a visual depiction of a segment within the visual depiction of the signal;
   receiving first input that selects the segment of the signal, wherein the signal comprises the selected segment and one or more non-selected segments of the signal, and wherein the selected segment is followed by the one or more non-selected segments on a timeline;
   automatically performing, in response to receiving second input that changes the duration of the visual depiction of the selected segment relative to a time domain, a corresponding change to the signal data represented by the selected segment by shrinking the selected segment of the signal without changing the duration of the one or more non-selected segments of the signal relative to the time domain and, without shifting any of the one or more non-selected segments that followed the segment on the timeline to create a gap between the selected segment of the signal and the one or more non-selected segments that followed the selected segment on the timeline, and by automatically filling the gap with data that represents silence or with an ambient noise segment;
   wherein the method is performed by a computing device.

14. The method of claim 13 wherein:
the user interface control allows a user to move a boundary of the selected segment; and
the method further comprising redrawing the visual depiction of the selected segment as the boundary is moved.

15. A non-transitory computer-readable medium storing one or more sequences of instructions which, when executed by one or more processors, causes the one or more processors to perform the method recited in claim 14.

16. A non-transitory computer-readable medium storing one or more sequences of instructions which, when executed by one or more processors, causes the one or more processors to perform the method recited in claim 13.

17. The method of claim 13, further comprising:
producing, in response to receiving third input, edited signal data by changing the duration of the selected segment of the signal relative to the time domain by stretching the selected segment of the signal without changing the duration of the one or more non-selected segments, and by automatically shifting the one or more non-selected segments of the signal that followed the selected segment on the timeline to allow for the increased duration of the selected segment after the duration of the selected segment has been increased.

18. A non-transitory computer-readable medium storing one or more sequences of instructions which, when executed by one or more processors, causes the one or more processors to perform the method recited in claim 17.

19. The method of claim 13, further comprising:
producing, in response to receiving third input, edited signal data by changing the duration of the selected segment of the signal relative to the time domain by stretching the selected segment of the signal without changing the duration of the one or more non-selected segments of the signal relative to the time domain and without shifting the one or more non-selected segments that followed the selected segment on the timeline, and by deleting an overlapping portion of the one or more non-selected segments that followed the selected segment on the timeline and that otherwise would overlap over the selected segment of the signal.

20. A non-transitory computer-readable medium storing one or more sequences of instructions which, when executed by one or more processors, causes the one or more processors to perform the method recited in claim 19.

21. The method of claim 13, further comprising:
producing, in response to receiving third input, edited signal data by changing the duration of the selected segment of the signal relative to the time domain by shrinking the selected segment of the signal without changing the duration of the one or more non-selected segments of the signal relative to the time domain, and by automatically shifting the one or more non-selected segments of the signal that followed the selected segment on the timeline so that no gap exists after the duration of the selected segment has been reduced.

22. A non-transitory computer-readable medium storing one or more sequences of instructions which, when executed by one or more processors, causes the one or more processors to perform the method recited in claim 21.

* * * * *